(12) United States Patent
Crowe (10) Patent No.: US 10,471,533 B2
(45) Date of Patent: Nov. 12, 2019

(54) POWER TRANSFER ASSEMBLY FOR CONTACT-START PLASMA ARC TORCH

(71) Applicant: Thermacut, k.s., Uherske Hradiste (CZ)

(72) Inventor: George A. Crowe, Claremont, NH (US)

(73) Assignee: THERMACUT, K.S., Uherske Hradiste (CZ)

( * ) Notice: Subject to any disclaimer, the term of this patent is extended or adjusted under 35 U.S.C. 154(b) by 721 days.

(21) Appl. No.: 15/156,374

(22) Filed: May 17, 2016

(65) Prior Publication Data

US 2016/0375519 A1    Dec. 29, 2016

Related U.S. Application Data

(60) Provisional application No. 62/183,798, filed on Jun. 24, 2015.

(51) Int. Cl.
*B23K 10/00*    (2006.01)

(52) U.S. Cl.
CPC ................... *B23K 10/006* (2013.01)

(58) Field of Classification Search
CPC .... H05H 1/34; H05H 2001/3489; H05H 1/28; H05H 1/3405; H05H 2001/3457; H05H 2001/3478; B23K 9/0671; B23K 10/006; B23K 9/1006
USPC ......................... 219/121.49, 121.48, 121.57
See application file for complete search history.

(56) References Cited

U.S. PATENT DOCUMENTS

| | | | | |
|---|---|---|---|---|
| 4,791,268 A | * | 12/1988 | Sanders | B23K 9/0671 219/121.48 |
| 4,902,871 A | * | 2/1990 | Sanders | B23K 9/0671 219/121.49 |
| 5,164,569 A | * | 11/1992 | Porra | H05H 1/34 219/121.48 |
| 5,796,067 A | * | 8/1998 | Enyedy | B23K 10/00 219/121.52 |
| 5,886,315 A | * | 3/1999 | Lu | H05H 1/34 219/121.39 |
| 8,035,055 B2 | * | 10/2011 | Twarog | B23K 10/006 219/121.41 |
| 9,227,265 B2 | | 1/2016 | Crowe | |
| 2012/0181257 A1 | | 7/2012 | Mather et al. | |

(Continued)

*Primary Examiner* — Chee-Chong Lee
(74) *Attorney, Agent, or Firm* — Warner Norcross and Judd LLP (57) ABSTRACT

A power transfer assembly for supplying electrical power to an electrode of a contact-start plasma arc torch has two conductive elements biased by a compression spring. The conductive elements are provided with mating structures that are defined by parallel surfaces that can be slidably engaged with each other. The conductive elements are configured to engage the spring such that positioning the mating structures to slidably engage each other generates an off-axis force in the spring that biases the mating structures together along at least one line of contact to assure an electrically conductive path through the mating structures from one conductive element to the other. One conductive element is a static element that is positioned against a power supplying element of the torch, while the other is a movable element that engages or is attached to the electrode.

15 Claims, 9 Drawing Sheets

(56) References Cited

U.S. PATENT DOCUMENTS

2013/0126487 A1* 5/2013 Crowe ............... B23K 10/00
219/121.48
2015/0351213 A1 12/2015 Crowe et al.

* cited by examiner

POWER TRANSFER ASSEMBLY FOR CONTACT-START PLASMA ARC TORCH

FIELD OF THE INVENTION

The present invention provides an improved structure for providing electrical power to the electrode of a contact-start plasma arc torch.

BACKGROUND

Many contact-start plasma arc torches employ an electrode that is initially biased to a forward position and is subsequently blown to a rearward position by gas pressure as a plasma-sustaining arc is generated. The electrode must be provided electrical power in both the forward and the rearward positions, as well as while moving to the rear position, and the means for providing the power must be structured so as to allow the motion of the electrode. The power-transfer structure may also be required to provide the bias of the electrode toward its forward position and to limit rearward motion of the electrode so as to define its rearward position. One approach to providing such a structure is to employ a spring-loaded plunger that engages the electrode, in combination with means for supplying electrical power to the plunger from a contact element that is electrically connected to a power supply when the torch is assembled. This approach is taught in U.S. Pat. No. 9,227,265.

A particular concern is providing a conductive path to the electrode when it is in its forward position, which has recently been done by passing current through a spring that serves to bias the electrode to its forward position. This approach has been found to create problems of conductivity when the spring is formed from heat-resistant material such as Inconel, which is a poor conductor. To avoid a requirement that the spring conduct current, U.S. Publication 2015/0351213 (incorporated herein by reference) teaches a power transfer assembly that employs conductive elements having mating structures with translating parallel surfaces to provide a conductive path that is independent of the spring. To assure that the surfaces are maintained in contact, the spring employed to bias the electrode is a combination compression and torsion spring that also applies a torsional load to the parallel surfaces to keep them in contact with each other. While this approach has been found effective in providing a conductive path without relying on the spring, it may complicate fabrication of the resulting assembly. Thus, there is a need for a power transfer assembly which can provide the same benefit of providing an independent conductive path to the electrode while simplifying fabrication of the assembly.

SUMMARY OF THE INVENTION

The present invention provides a power transfer assembly for supplying electrical power to an electrode of a contact-start plasma arc torch when initiating an arc, without relying on a spring that provides a forward biasing force to the electrode to conduct the current.

The power transfer assembly has two conductive elements, a static element and a movable element that are formed of conductive material, and also has a compression spring that provides a separation force between the static and movable elements. The static element is configured to connect to a source of electrical power in the torch, while the movable element is configured to engage the electrode, and in some embodiments can be provided by a portion of the electrode itself.

Means are provided to limit the rearward motion of the movable element when the electrode is blown back against the compressive force of the spring, in order to assure a consistent rearward position of the electrode. In many embodiments, each of the elements has a contact surface, and these contact surfaces are opposed to each other so as to mate against each other to limit the rearward motion of the movable element. Typically, the engagement of these contact surfaces provides a conductive path between the static and movable elements capable of accommodating high amperage currents, to conduct electrical current to the electrode when in its rearwards position, during a transferred arc mode of operation. Alternative means for limiting the motion could be employed, such as a blocking surface on an insulated component of the torch which serves to house the power transfer assembly.

When the electrode is in its forward position, electrical current is conducted from the static element to the movable element via the engagement of a first mating structure, provided on the static element, with a second mating structure, provided on the movable element. The first mating structure is disposed about a first mating structure axis, and has first mating structure sidewalls that are parallel to the first mating structure axis. Similarly, the second mating structure is disposed about a second mating structure axis, and has second mating structure sidewalls that are parallel to the second mating structure axis. The sidewalls of the mating structures are configured such that they can be translated with respect to each other in a direction parallel to the mating structure axes, and are further configured so as to provide a sufficient range of translation as to allow the movable element, and the electrode engaged therewith, to be translated against the bias of the compression spring to a location where the movable element defines the desired rearward position of the electrode.

The compression spring serves to bias the movable element away from the static element, so as to bias the electrode to its forward position. Typically, each of the conductive elements has a spring-engaging bearing surface, and these surfaces face each other so as to engage a coil of the spring and apply a compressive load thereto when the mating structures are translatably engaged with each other. The coil has a coil length $L_C$ selected such that the coil is compressed and applies a separation force to the static and movable elements to bias the electrode to its forward position.

When at rest and not subjected to stresses, the coil of the spring is centered on a spring natural axis. The spring and the conductive elements are configured such that their engagement causes the spring to apply an off-axis force between the mating structures of the conductive elements when the conductive elements are positioned to slidably engage the mating structures with each other. This off-axis force causes the spring to bias the mating structures together along at least one line of contact, to assure electrical conductivity through these forcibly-engaged surfaces. This conductive connection through the mating structures provides a conductive path from a power supply of the torch, which the static element contacts, through the mating structures to the movable element, which is in contact with the electrode or formed as a part thereof; this conductive path is independent of the spring, which can then be fabricated from a material selected for desirable properties such as heat resistance rather than conductivity.

One approach to causing the spring to generate an off-axis force is to configure the conductive elements so as to create a misalignment that requires a portion of the coil to be displaced off the spring natural axis in order to slidably engage the mating structures together. In this approach, each of the conductive elements is also provided with a spring-aligning means that engages a spring end of the spring to maintain the spring end in alignment with the conductive element with which it is engaged. Examples of such means for aligning the spring ends are outward-facing cylindrical surfaces sized to engage the inner surfaces of the coil of the spring, inward-facing cylindrical surfaces that engage the outer surfaces of the coil, and axial passages or recesses that engage spring end extensions that extend from the coil parallel to the spring natural axis. The spring engages the static element spring-aligning means and the movable element spring-aligning means so as to align the spring ends, respectively, relative to the first mating structure and the second mating structure. The aligning means are configured such that at least one of the spring ends must be forcibly displaced from the spring natural axis in order to position the conductive elements so as to slidably engage the parallel sidewalls of the mating structures with each other, thereby applying an off-center force on the spring. The resistance of the spring to this off-center force generates an off-axis reaction force that acts to bias the sidewalls of the mating structures into engagement with each other along at least one line of contact.

The misalignment required to displace the spring ends from alignment with each other can be most easily understood in the case where the mating structures are each symmetrically disposed about a mating structure axis, and where the static element spring-aligning means and the movable element spring-aligning means are provided by cylindrical spring-aligning surfaces that engage the coil of the spring at spring end regions; the static element spring-aligning surface is centered on a static element alignment axis, and the movable element spring-aligning surface is centered on a movable element alignment axis. At least one of the mating structure axes is parallel to but offset from the alignment axis of the conductive element on which that mating structure is provided, and thus is misaligned with the spring end region that engages that conductive element. Moving the conductive element relative to the other to align its off-center mating structure with the mating structure provided on the other conductive element sufficiently to slidably engage the mating structures together forces the spring end region that is engaged with the first conductive element out of alignment with the spring end region that is engaged with the other conductive element, thus creating the reaction force that biases the mating structures together. It should be appreciated that alternative configurations of mating structures can be employed, so long as the relationship of the sidewalls that contact to the alignment means of the conductive elements are arranged such that the spring end regions must be forced out of alignment to slidably engage the mating structures together.

An alternative approach to providing the off-axis force to bias the mating structures against each other is to configure the spring and the conductive elements such that engagement between the spring and the conductive elements positions the spring with the spring natural axis at an inclination to the mating structure axes, rather than parallel thereto. This inclination creates a component of the separation force generated by the spring that is perpendicular to the mating structure axes, and which acts to force the mating structures into engagement.

Such inclination of the spring natural axis can be provided by forming the spring with a spring first end face and a spring second end face that each reside along parallel planes that are inclined with respect to the spring natural axis. If the conductive elements each have a spring-engaging bearing surface that extends perpendicular to the mating structure axes, engagement of the spring end faces against these bearing surfaces causes the spring natural axis to be inclined with respect to the mating structure axes. It is felt that an inclination of about 2°-12° should be effective.

A similar effect could be achieved by forming the spring-engaging structures of the conductive elements on an inclination to position the spring. For example, the spring-engaging bearing surfaces could be inclined with respect to the mating structure axes rather than perpendicular thereto, while the spring end faces reside in planes perpendicular to the spring natural axis. Such alternative structures are likely more difficult to fabricate than providing inclined end faces on the spring itself.

In either approach to providing the off-axis force, the biased engagement of the mating structures is accomplished without the limitation of requiring the spring to apply a torsional force on the conductive elements, as is required in the power transfer assemblies taught in U.S. Publication 2015/0351213. This reduced limitation on the spring allows the resulting power transfer assembly to be more readily fabricated. Furthermore, by avoiding the use of torsional forces, the friction between the surfaces of the mating structures should be reduced, thereby providing greater reliability in the movement of the electrode, while still maintaining sufficient electrical contact between the mating structures to conduct current to the electrode without requiring conduction through the spring.

To facilitate replacement, the power transfer assembly can be attached to the electrode, so as to be replaced when the electrode is replaced. Alternatively, the power transfer assembly can be contained within a power transfer housing that can be removed and replaced as unit, allowing it to be readily replaced, but less frequently than the electrode. In this latter case, retaining the power transfer assembly within a housing reduces the risk of loose parts becoming lost when the torch is disassembled to replace the electrode.

BRIEF DESCRIPTION OF FIGURES

FIG. 1 illustrates a power transfer assembly of the present invention which employs misalignment of the elements to generate an off-axis biasing force. The power transfer assembly of this embodiment has a static element having a first mating structure that is formed as a hexagonal recess, and a movable element having a second mating structure that is formed as a hexagonal protrusion. The hexagonal recess is centered on a recess axis that is also the axis of symmetry of a cylindrical static element spring-aligning surface. In contrast, the hexagonal protrusion is centered on a protrusion axis that is parallel to and offset from a movable element axis about which a cylindrical movable element spring-aligning surface is symmetrical. A compression spring engages the conductive elements so as to apply a separation force thereto, and has a coil with a central spring natural axis. The spring-aligning surfaces of the conductive elements are sized to closely engage inner surfaces of the coil of the spring to align the spring with the conductive elements. The cylindrical spring-aligning surfaces have a diameter $D_A$ which is close in diameter to a coil inner diameter $D_S$ of the coil of the spring, and preferably is sized so as to provide an interference fit with the coil. Because the protrusion axis is offset from the movable element axis, the movable element must be shifted away from alignment with the recess axis in order to slidably engage the protrusion with the recess, and this shift also shifts the end of the coil that is engaged with the movable element spring-aligning surface away from the spring natural axis. The resistance of the spring to this shift creates a biasing force to forcibly engage sidewalls of the protrusion with corresponding sidewalls of the recess.

FIG. 2 is a schematic view of the hexagonal recess and protrusion shown in FIG. 1. The protrusion axis is offset relative to the movable element axis toward one vertex of the hexagonal cross section; this offset is greatly exaggerated in the figures for purposes of illustration. Since one end of the coil of the spring is centered on the movable element axis, the off-axis protrusion forces this end of the coil away from the spring natural axis, and the memory of the spring applies a lateral force, attempting to align the movable element axis with the recess axis, thereby maintaining contact between the protrusion and the recess.

FIG. 6 illustrates the power transfer assembly when it has been assembled and the retention post has been peened to retain it in the retention passage, thereby trapping the spring between the bearing surfaces of the static element and the movable element. FIG. 7 shows the conductive elements with the spring omitted to more clearly illustrate the interaction of the conductive elements.

FIGS. 8 and 9 illustrate another power transfer assembly that is attached to the electrode of the torch and thus is replaced with the electrode. In this embodiment, the static element has an octagonal protrusion and an outward-facing cylindrical static element spring-aligning surface, while the movable element is part of the electrode and has an octagonal recess and an outward-facing cylindrical movable element spring-aligning surface. The octagonal protrusion is offset from the static element spring-aligning surface, requiring it to be offset from the movable element spring-aligning surface to insert the protrusion into the recess. A stepped pin passing through the static element and anchoring in the movable element serves to retain the static element and a trapped spring engaged with the electrode.

FIGS. 12-14 illustrate a power transfer assembly that employs a spring having inclined end faces, such that the spring natural axis becomes tilted with respect to the mating structure axes when the spring engages the conductive elements. This tilt creates a component of the spring force that is perpendicular to the mating structure axes, thereby serving as a biasing force to engage surfaces of the mating structures into contact with each other. FIG. 12 shows the components of the power transfer assembly exploded.

DETAILED DESCRIPTION

Figures 1, 2:
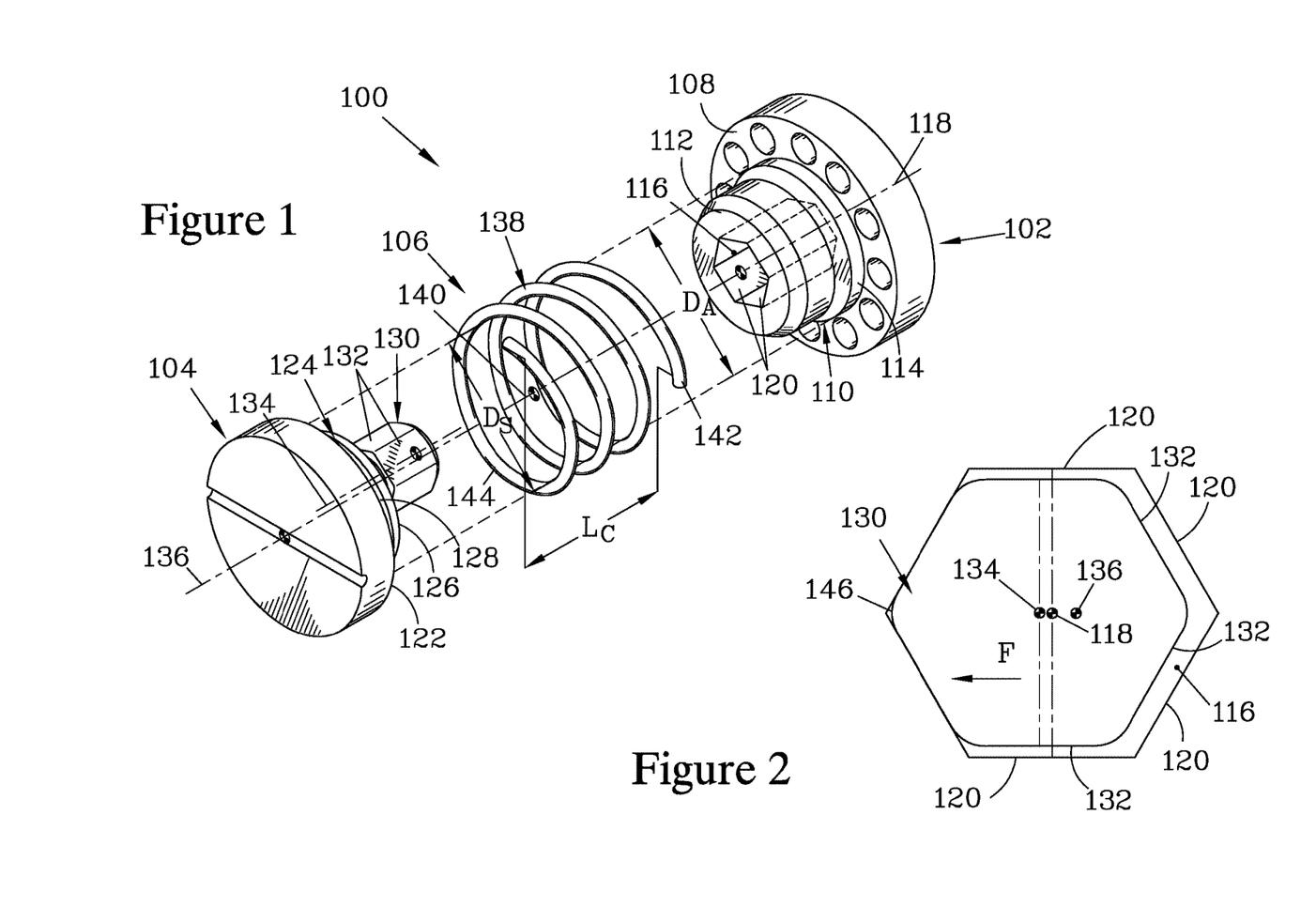

FIG. 1 illustrates a power transfer assembly 100 that forms one embodiment of the present invention. The assembly 100 resides within a contact-start plasma arc torch to bias an electrode toward a forward position while allowing it to be blown back by gas pressure to a rearward position, while supplying a conductive path to provide electrical current to the electrode; such torches and electrodes are discussed in U.S. Pat. No. 9,227,265 and U.S. Publication 2015/0351213, both incorporated herein by reference. The assembly 100 has a static element 102, a movable element 104, and a compression spring 106 that connects between the static element 102 and the movable element 104. In the assembly 100, the movable element 104 is formed as a plunger that engages a base surface of the electrode (not shown) of the torch, while the static element 102 is configured to be installed in the torch such that it engages a power transfer component of the torch that in turn is connected to an electrical power supply (as discussed below with regard to FIG. 4).

The static element 102 has a static element spring-engaging bearing surface 108 and a static element extension 110. The static element extension 110 terminates at a forward-facing static element contact surface 112 and has an outward-facing static element spring-aligning surface 114 having an aligning surface diameter $D_A$. A shaped recess 116 extends from the static element contact surface 112 along a first mating structure axis 118, providing a first mating structure. The shaped recess 116 is defined by first mating structure sidewalls 120 that extend parallel to the first mating structure axis 118. The static element spring-aligning surface 114 is also symmetrically disposed about the first mating structure axis 118, and thus the first mating structure axis 118 could alternatively be considered to be a static element alignment axis.

The movable element 104 has a movable element spring-engaging bearing surface 122 and a movable element extension 124, which terminates in a rearward-facing movable element contact surface 126 and has an outward-facing movable element spring-aligning surface 128 having the diameter $D_A$. Extending rearward from the movable element contact surface 126 is a shaped protrusion 130, which serves as a second mating structure and is defined by second mating structure sidewalls 132 that extend parallel to a second mating structure axis 134. The shaped protrusion 130 is configured to translatably engage the shaped recess 116. The movable element spring-aligning surface 128 is symmetrical about a movable element alignment axis 136 that is parallel to and offset from the second mating structure axis 134.

Figure 4:
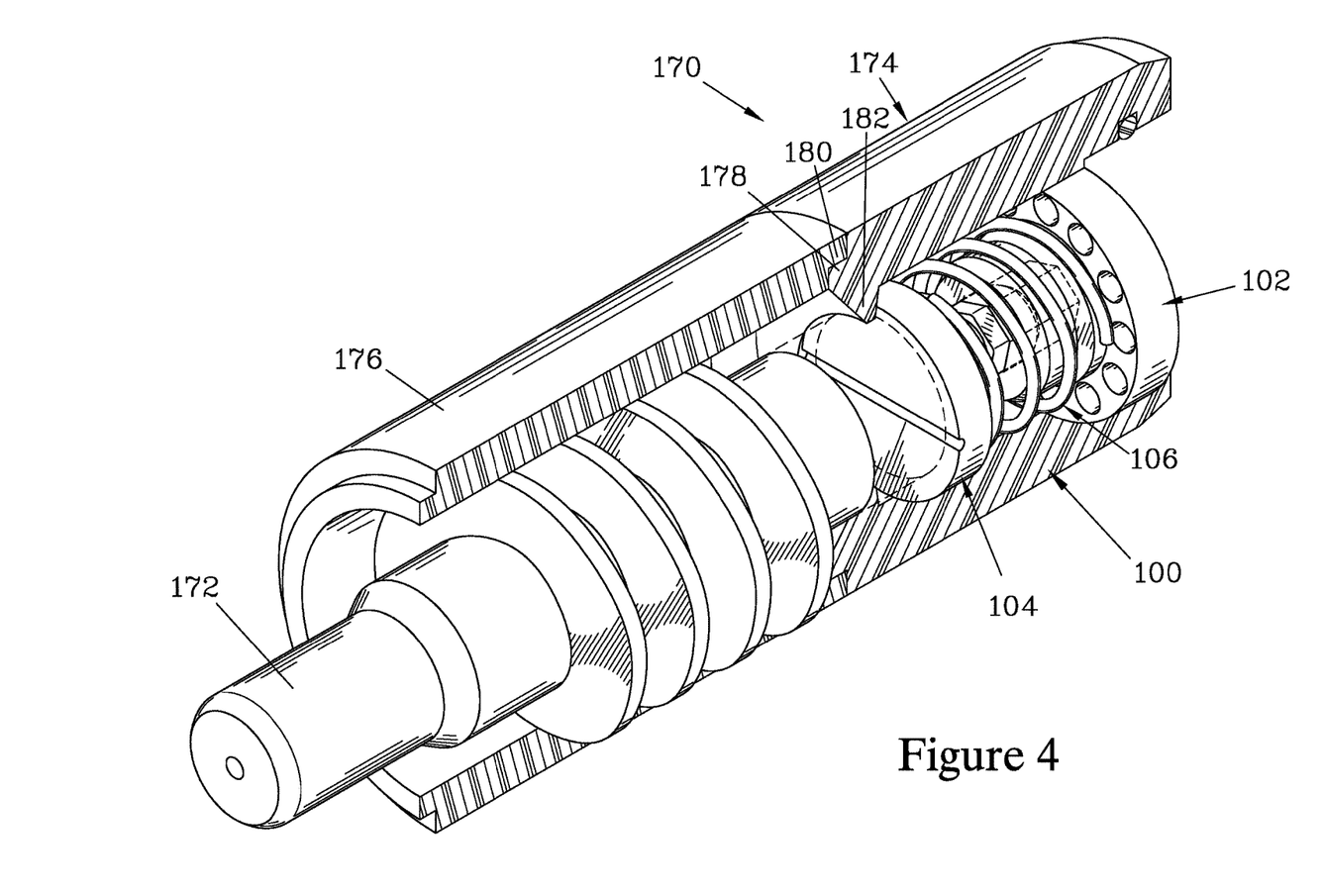
FIG. 4 is an isometric view showing the power transfer assembly shown in FIG. 1 when assembled and installed into a power transfer housing that mates against a swirl ring of a contact-start torch. The power transfer assembly forms a self-contained structure in the power transfer housing, allowing the power transfer assembly to be readily replaced as a unit.

The spring 106 has a coil 138 which, at rest, is disposed about a central spring natural axis 140. The coil 138 has an inside diameter $D_S$ that is sized relative to the alignment surface diameter $D_A$ such as to seat over the static and movable element spring-aligning surfaces (114, 128), and preferably engages these surfaces (114, 128) with an interference fit. The engagement of the coil 138 with the spring-aligning surfaces (114, 128) serves to align a coil first end region 142 with the first mating structure axis 118, and a coil second end region 144 with the movable element alignment axis 136. The coil 138 has a coil length $L_C$ such that it is placed in compression between the static element spring-engaging bearing surface 108 on the static element 102 and the movable element spring-engaging bearing surface 122 on the movable element 104 when the three components (102, 104, 106) are installed in the torch (as shown in FIG. 4), and thus serves to bias the movable element 104 to bias the electrode of the torch to its forward position. When the electrode is blown back, the coil 138 is further compressed, and is configured to allow the movable element 104 to move far enough that the movable element contact surface 126 becomes engaged with the static element contact surface 112, thus providing a positive rearward position for the electrode and providing an additional conductive path via the contact surfaces (112, 126) when the electrode is blown back to its rearward position. It should be appreciated that the lengths of the spring-aligning surfaces (114, 128) along the axes (118, 136) must be limited to allow the coil 138 to freely compress to avoid obstructing rearward movement of the movable element 104.

Because the second mating structure axis 134 is offset from the movable element alignment axis 136 (as more clearly shown in FIG. 2), the movable element 104 must be shifted with respect to the static element 102 in order to slidably engage the protrusion 130 with the recess 116, to a position where the movable element alignment axis 136 is not aligned with the first mating structure axis 118. The shifted position of the movable element 104 is one where the second mating structure axis 134 is nearly aligned with the first mating structure axis 118. Since the coil second end region 144 engages the movable element spring-aligning surface 128 that is centered on the movable element alignment axis 136, while the coil first end region engages the static element spring-aligning surface 114 that is centered on the first mating structure axis 118, shifting the movable element 104 to insert the protrusion 130 into the recess 116 acts to shift the coil second end region 144 away from the spring natural axis 140. The resiliency of the spring 106 applies an off-axis restoring force (indicated by arrow F) to bias the coil second end region 144, and thus the movable element 104 with which it is engaged, back toward the spring natural axis 140. This restoring force acts to force some of the second mating structure sidewalls 132 against the corresponding first mating structure sidewalls 120. In the movable element 104, the second mating structure axis 134 is offset from the movable element alignment axis 136 in the direction of a vertex 146 between two of the sidewalls 132 (as shown in FIG. 2), thereby forcing the protrusion 130 to engage the recess 116 along two of the pairs of adjacent sidewalls (120, 132) to provide a significant electrical contact area between the protrusion 130 and the recess 116. Alternatively, the recess 116 could be offset; however, offsetting the protrusion is felt to make the conductive elements (102, 104) easier to machine. The magnitude of the offset of the second mating structure axis 134 from the movable element alignment axis 136 is greatly exaggerated in the figures for purposes of illustration. Only a small offset should be needed; in an embodiment where the clearance between the protrusion 130 and the recess 116 is 0.05 mm, an offset of the axes (134, 136) in the range of about 0.2 mm is felt to provide a sufficient biasing force. While the protrusion of this embodiment is provided on the movable element and the recess in the static element, it should be appreciated by one skilled in the art that these mating structures could be reversed. Furthermore, as noted above, the offset mating structure could be centered on the axis of symmetry of the conductive element on which it is provided if the spring-aligning surface of the conductive element is offset with respect to that axis.

To assure electrical contact between the shaped recess 116 and the shaped protrusion 130, the static element 102 and the movable element 104 should be made from materials that remain highly conductive with use. Examples of suitable materials are plated brass or copper and chromium-nickel alloyed copper such as is commercially available as "beryllium-free copper"; suitable plating materials include, but are not limited, to silver, hard chrome, and nickel. Since the spring 106 is not relied upon to provide conductivity between the static element 102 and the movable element 104 when the electrode is in its forward position, it can be fabricated from a material with a high resistance to heat damage during use, but need not be conductive. One suitable material is Inconel.

Figure 3:
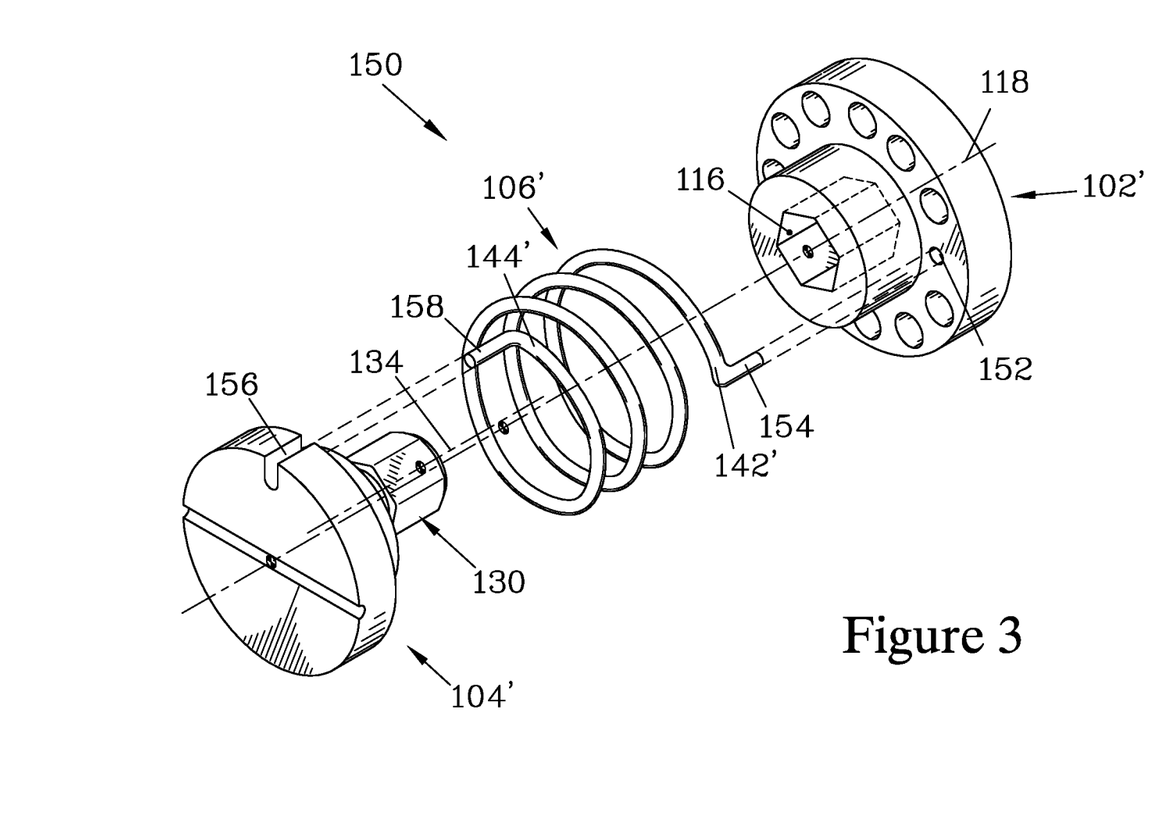
FIG. 3 is an isometric view of a power transfer assembly that is similar to that shown in FIGS. 1 and 2, but where the spring has axially-extending spring ends that engage spring retainers in the conductive elements, aligned such that the spring natural axis is coincident with the common axis of the conductive elements, and thus is parallel to and offset from the protrusion axis.

FIG. 3 illustrates a power transfer assembly 150 that has many features in common with the assembly 100 discussed above, differing only in the structures employed to align the spring 106' with the static element 102' and with the movable element 104'. In this embodiment, the static element 102' is provided with an axial spring end retainer passage 152 that extends parallel to the first mating structure axis 118, and which is slidably engaged by a spring first end 154 that extends from the coil first end region 142'. Similarly, the movable element 104' is provided with an axially-extending spring end retainer notch 156 that is parallel to the second mating structure axis 134 and is slidably engaged by a spring second end 158 that extends from the coil second end region 144'. The spring end retainer passage 152 and the spring end retainer notch 156 are respectively positioned relative to the first mating structure axis 118 and the second mating structure axis 134 such that positioning the protrusion 130 to slidably insert into the recess 116 displaces the coil second end region 144' away from alignment with the coil first end region 142', thereby creating a reaction force in the spring 106' that biases the recess 116 and the protrusion 130 into engagement similar to that shown in FIG. 2.

The power transfer assembly can be designed as a self-contained unit so as to reduce the likelihood of parts becoming lost when the torch is disassembled to replace the electrode. When designed as a unit, the power transfer assembly can be readily replaced; typically, the power transfer assembly is replaced less often than the electrode, such as replacing the power transfer assembly once for every five electrodes. FIG. 4 illustrates one example of a power transfer unit 170 for use providing electrical power and biasing an electrode 172 of a contact-start plasma arc torch, in the example shown in FIG. 4, the power transfer unit 170 employs the power transfer assembly 100 shown in FIG. 1 and discussed above, however, alternative power transfer assemblies could be similarly employed. The power transfer unit 170 has a power transfer housing 174 that is held in place in the torch by a swirl ring 176 of the torch when the torch is assembled. The swirl ring 176 serves to direct gas onto the electrode 172, which is slidably housed therein. The power transfer housing 174 can be provided with a stepped forward edge 178 that mates against a corresponding stepped rear edge 180 provided on the swirl ring 176, the engagement of these stepped edges (178, 180) serving to align the power transfer unit 170 with respect to the electrode 172, which is centered in the swirl ring 176.

The static element 102 is press-fitted into the power transfer housing 174, and is positioned such that installation of the power transfer housing 174 and the swirl ring 176 along with remaining components of the torch serves to place the static element 102 in contact with a power supply component of the torch (in the same manner as shown in FIG. 1 of U.S. Pat. No. 9,227,265, incorporated herein by reference). The compression spring 106 biases the movable element 104 against a ledge 182 on the power transfer housing 174. The ledge 182 limits forward motion of the movable element 104 and thereby retains it within the power transfer unit 170, while the spring 106 is retained in the power transfer housing 174 by its engagement between the static element 102 and the movable element 104. Thus, both conductive elements (102, 104) and the spring 106 are retained in the power transfer housing 174 when the torch is disassembled to replace the electrode 172, which requires more frequent replacement than the power transfer unit 170. The use of a separate power transfer housing 174 rather than installing the components (102, 104, 106) in the swirl ring 176 reduces material costs, since the power transfer housing 174 can be made from less expensive material than the swirl ring 176 as it is less subject to heating during use. Additionally, the power transfer unit 170 typically requires replacement more often than the swirl ring 176 to assure optimal performance of the spring 106, and thus providing the power transfer housing 174 as a separate component reduces the structure that needs to be frequently replaced.

The embodiments discussed above are intended for contact-start torches that employ a spring-biased movable element that contacts a readily-removable electrode, similar to those taught in U.S. Pat. No. 9,227,265. The power transfer assembly of the present invention is particularly advantageous for such torches, as it allows for power conduction to the electrode without requiring the biasing spring of the torch to conduct current from the static element to the movable element during the initiation of the arc. Avoiding the need for the spring to conduct current allows the spring to be formed of less conductive, heat-resistant material. The power transfer assembly of the present invention can be employed in alternative contact-start torches where it is desired to provide electrical contact without depending on the spring, such as those in which the biasing structure for the electrode is attached to the electrode and replaced therewith, such as taught in U.S. Publication 2015/0351213.

Figure 5:
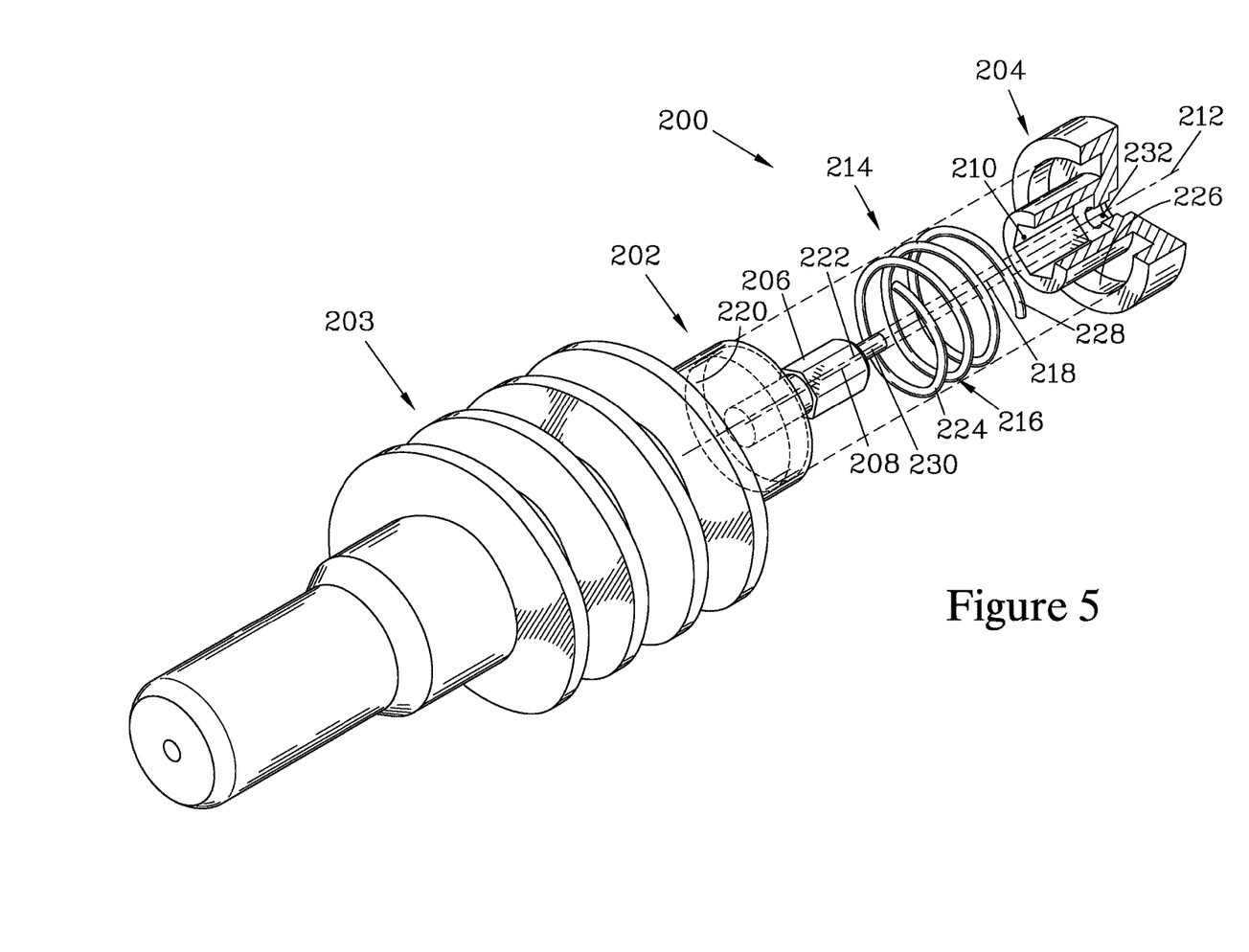
FIG. 5 is an isometric view of a power transfer assembly that forms another embodiment of the present invention; in this embodiment, the power transfer assembly is incorporated into the electrode of the torch, and an electrode body serves as the movable element. In this embodiment, the electrode body and the static element are provided with inward-facing cylindrical surfaces that engage outer surfaces of the coil to align the spring. The protrusion of this embodiment is provided with a retention post that extends through a retention passage in the static element when the components are assembled. The protruding end of the retention post can be peened to retain it in the retention passage to maintain the spring and the static element engaged with the electrode body.
Figure 6:
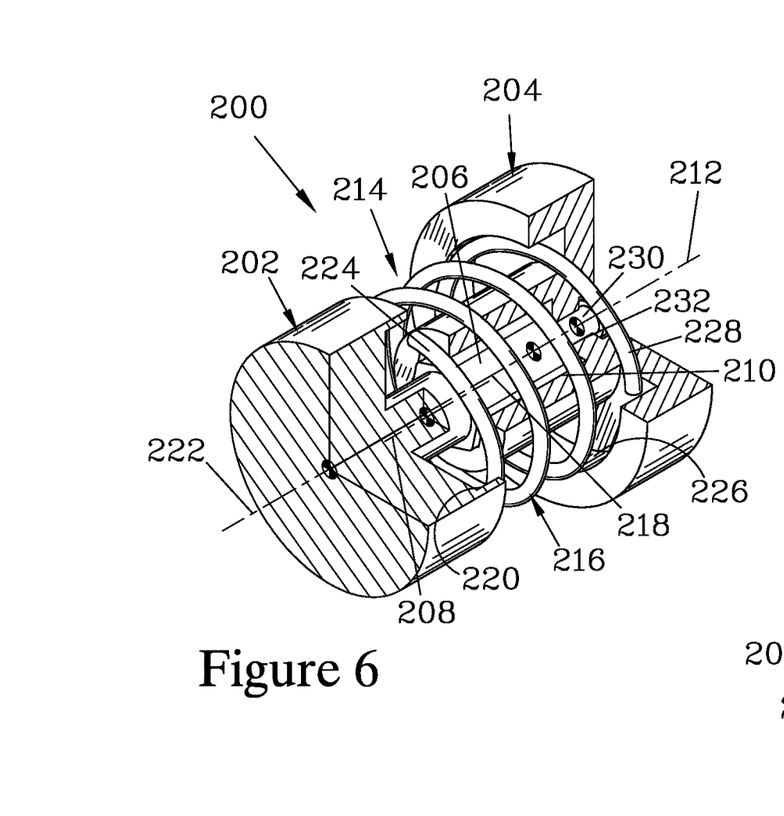
FIGS. 6 and 7 illustrate the power transfer assembly of FIG. 5 when the mating structures are slidably engaged, with the static element and the movable element partially sectioned to better illustrate the interaction of these elements and their engagement with the coil of the spring.
Figure 7:
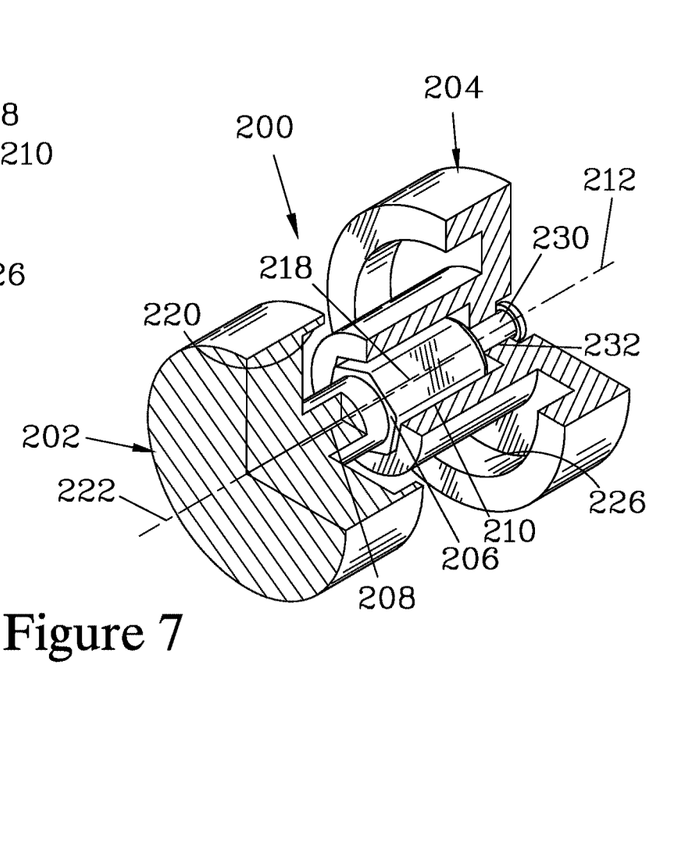

FIGS. 5-7 illustrate a power transfer assembly 200 having a movable element 202 that is an integral part of an electrode 203 of a contact-start torch, and where a spring-biased static element 204 is retained in engagement with the movable element 202, and thus is replaced when the electrode 203 is replaced. A shaped protrusion 206 extends from the movable element 202 along a protrusion axis 208, and engages a shaped recess 210 in the static element 204, which in turn extends along a recess axis 212. FIG. 5 shows the conductive elements (202, 204) prior to assembly, while FIGS. 6 and 7 show the elements (202, 204) when assembled.

The static element 204 is biased relative to the movable element 202 by a compression spring 214, having a coil 216 centered on a spring natural axis 218. In this embodiment, the movable element 202 is provided with a cylindrical, inward-facing movable element spring-aligning surface 220 that is symmetrical about a movable element axis 222 and is configured to engage the exterior of a coil first end region 224 of the coil 216. As better shown in FIGS. 6 and 7, the movable element axis 222 is offset from and parallel to the protrusion axis 208. The static element 204 is provided with a cylindrical, inward-facing static element spring-aligning surface 226 that is symmetrical about the recess axis 212 and is also configured to engage the exterior of a coil second end region 228 of the coil 216. To slidably insert the protrusion 206 into the recess 210, the static element 202 must be shifted to move the movable element axis 222 away from alignment with the spring natural axis 218 and the recess axis 212, thereby moving the coil first end region 224 away from the spring natural axis 218, creating an off-axis restoring force in the spring 214 that acts to force the protrusion 206 against the recess 210.

To retain the components (202, 204, 214) together when the electrode of the torch is replaced, the protrusion 206 can be provided with a retention post 230 that extends along the movable element axis 222 and passes through a retention passage 232 in the static element 204. The protruding portion of the retention post 230 can then be expanded by peening, as shown in FIG. 7, to retain it in the retention passage 232. Alternative approaches to retaining the components (202, 204, 214) together could be employed, such as attaching the spring 214 to both the conductive elements (202, 204) by adhesive, laser welding, interference fit, pinning, attaching with fasteners, etc.

Figures 8, 9:
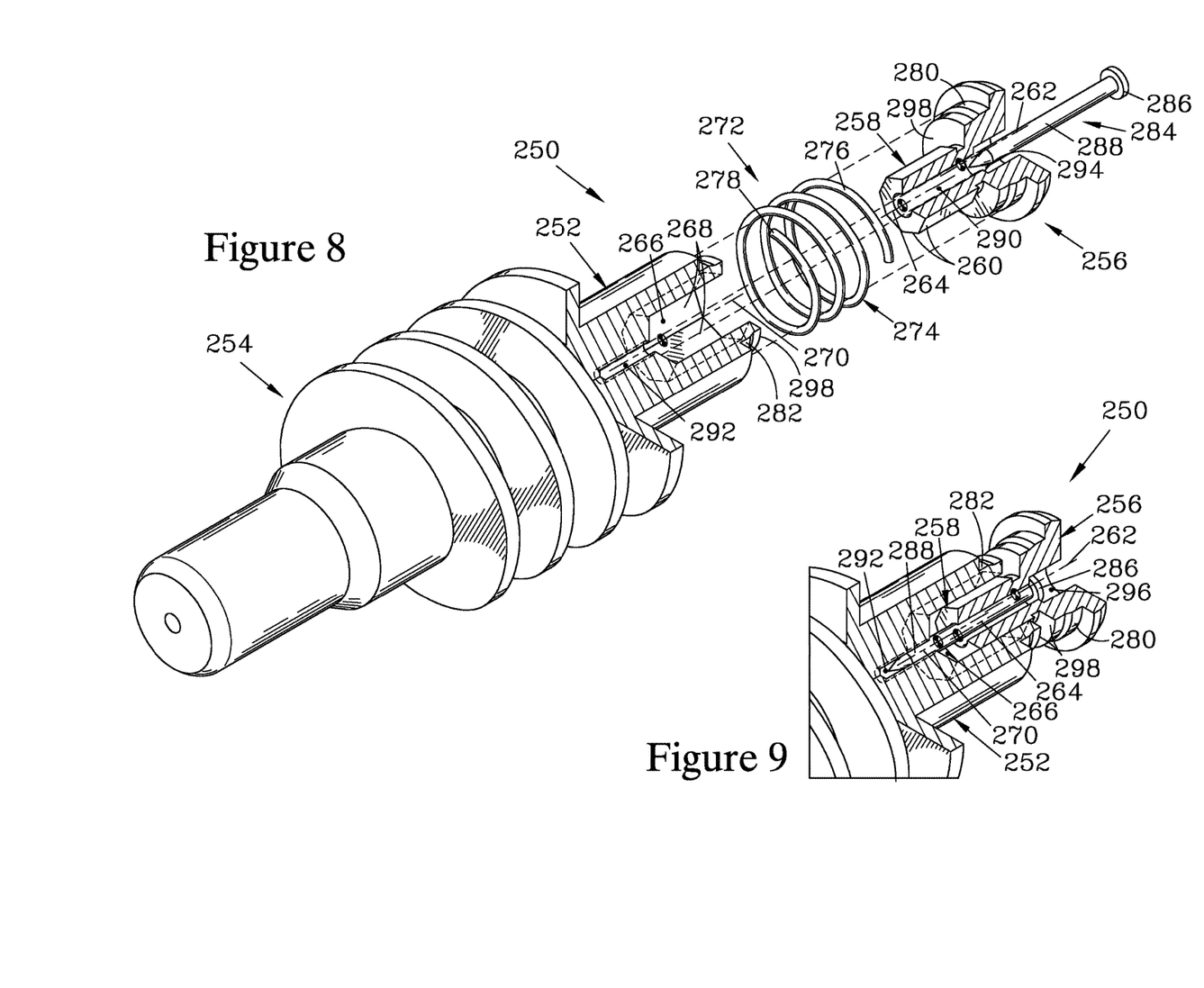

FIGS. 8 and 9 illustrate a power transfer assembly 250 having a movable element 252 that is again formed as an integral part of an electrode 254 of a contact-start torch, and where a spring-biased static element 256 is retained in engagement with the movable element 252. FIG. 8 shows the conductive elements (252, 256) prior to assembly, while FIG. 9 shows the conductive elements (252, 256) when assembled.

In this embodiment, a shaped protrusion 258 extends from the static element 256 to provide a first mating structure. The shaped protrusion 258 is formed as an octagonal prism having eight first mating structure sidewalls 260 that extend parallel to a static element alignment axis 262. However, the shaped protrusion 258 is centered about a first mating structure axis 264 that is parallel to and offset from the static element alignment axis 262, as best shown in FIG. 8. The movable element 252 is provided with a shaped recess 266 that provides a second mating structure, having second mating structure sidewalls 268 that extend parallel to a movable element alignment axis 270; the shaped recess 266 is centered about the movable element alignment axis 270.

The movable element 252 is biased relative to the static element 256 by a compression spring 272, having a coil 274 having a coil first end region 276 and a coil second end region 278. The coil first end region 276 engages a static element spring-aligning surface 280 that is an outward-facing cylindrical surface on the static element 256, and which is centered on the static element alignment axis 262.

Similarly, the coil second end region 278 engages a movable element spring-aligning surface 282 that is an outward-facing cylindrical surface of the movable element 252 that is centered on the movable element alignment axis 270. Because the shaped protrusion 258 is offset from the static element alignment axis 262, the static element spring-aligning surface 280 must be displaced from alignment with the movable element spring-aligning surface 282 in order to slidably engage the shaped protrusion 258 with the shaped recess 266, as shown in FIG. 9. This misalignment forces the coil first end region 276 to be displaced off-axis with respect to the coil second end region 278, generating a restoring force that tries to bring the coil end regions (276, 278) back into alignment, and thus forces the shaped protrusion 258 against the shaped recess 266. It should be appreciated that offset could be provided in the recess and/or one or both of the spring-aligning surfaces, so long as the spring-aligning surfaces must be misaligned in order to slidably engage the mating structures together.

Various means could be employed to retain the components (252, 256, 272) together when the electrode 254 is replaced. In the transfer assembly 250, a stepped pin 284 is employed. The stepped pin 284 has a pin head 286 and a pin shank 288. The pin shank 288 extends through a pin passage 290 in the shaped protrusion 258, and when the power transfer assembly 250 is assembled, the pin shank 288 is forcibly driven into a somewhat undersized pin anchor recess 292 provided in the movable element 252, the pin anchor recess 292 terminating at the shaped recess 266. The pin passage 290 is sized relative to the pin shank 288 to allow sufficient freedom of off-axis motion to allow the shaped protrusion 258 to be slidably engaged with the shaped recess 266. The pin head 286 is positioned to engage a head bearing surface 294 that terminates the pin passage 290 to retain the static element 256 attached to the electrode 254, also trapping the spring 272. The pin head 286 resides in a pin head recess 296 provided in the static element 256, the depth of the pin head recess 296 allowing sufficient motion of the movable element 252 (in which the pin shank 288 is anchored) relative to the static element 256 to allow the electrode 254 to move backwards in the torch to the specified rear position where contact surface 298 on the conductive elements (252, 256) engage, limiting further rearward motion. The stepped pin 284 should be formed from a material with sufficient rigidity and stability to allow it to be driven into the pin anchor recess 292 without distorting. Examples of suitable materials include, but are not limited, to hardened tool steel, high speed steel, and hard, rigid stainless steels such as 17-4 PH stainless steel.

Figure 10:
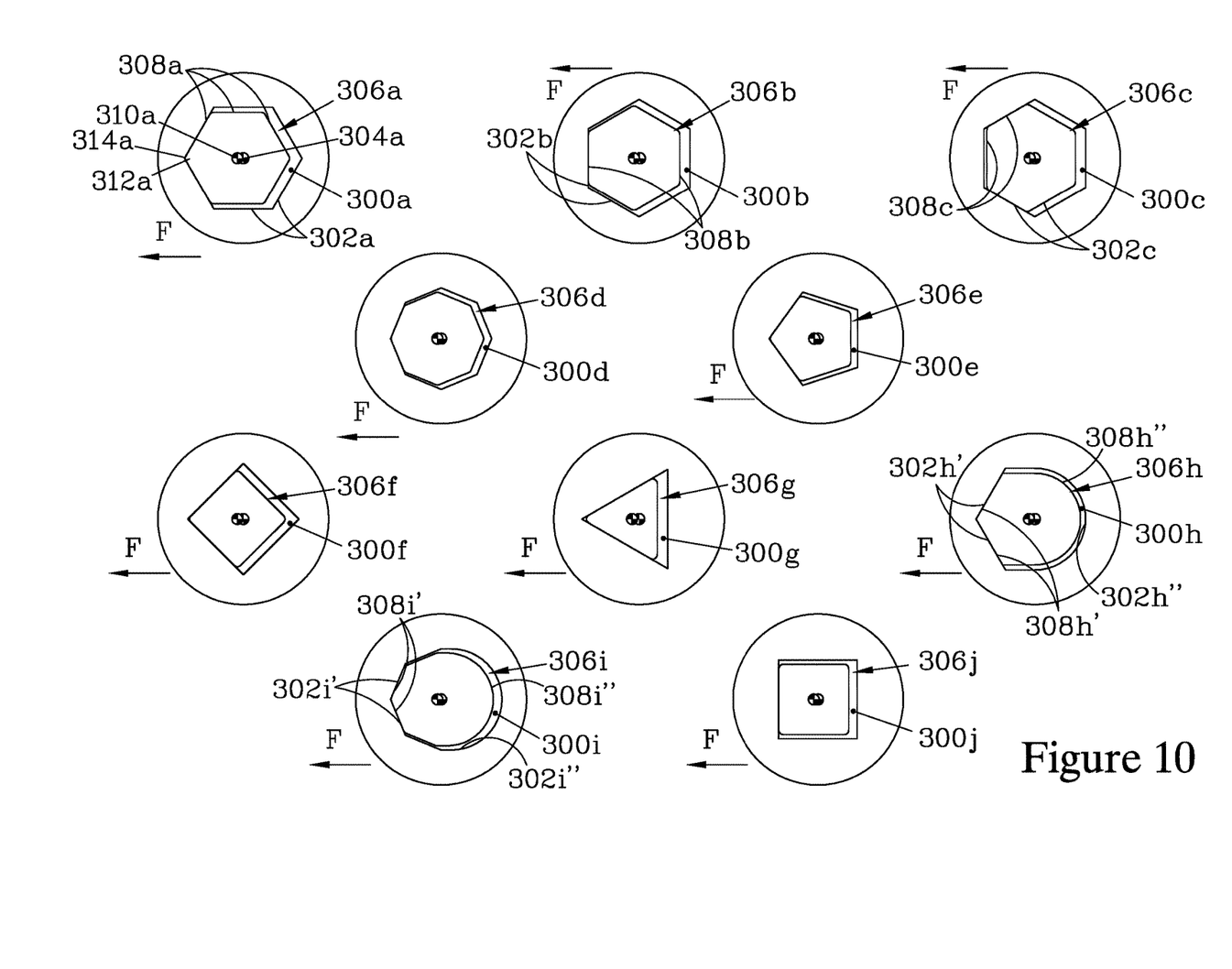
FIGS. 10 and 11 illustrate several alternative configurations of mating structures that can be employed in the power transfer assemblies shown in FIGS. 1-9.
Figure 11:
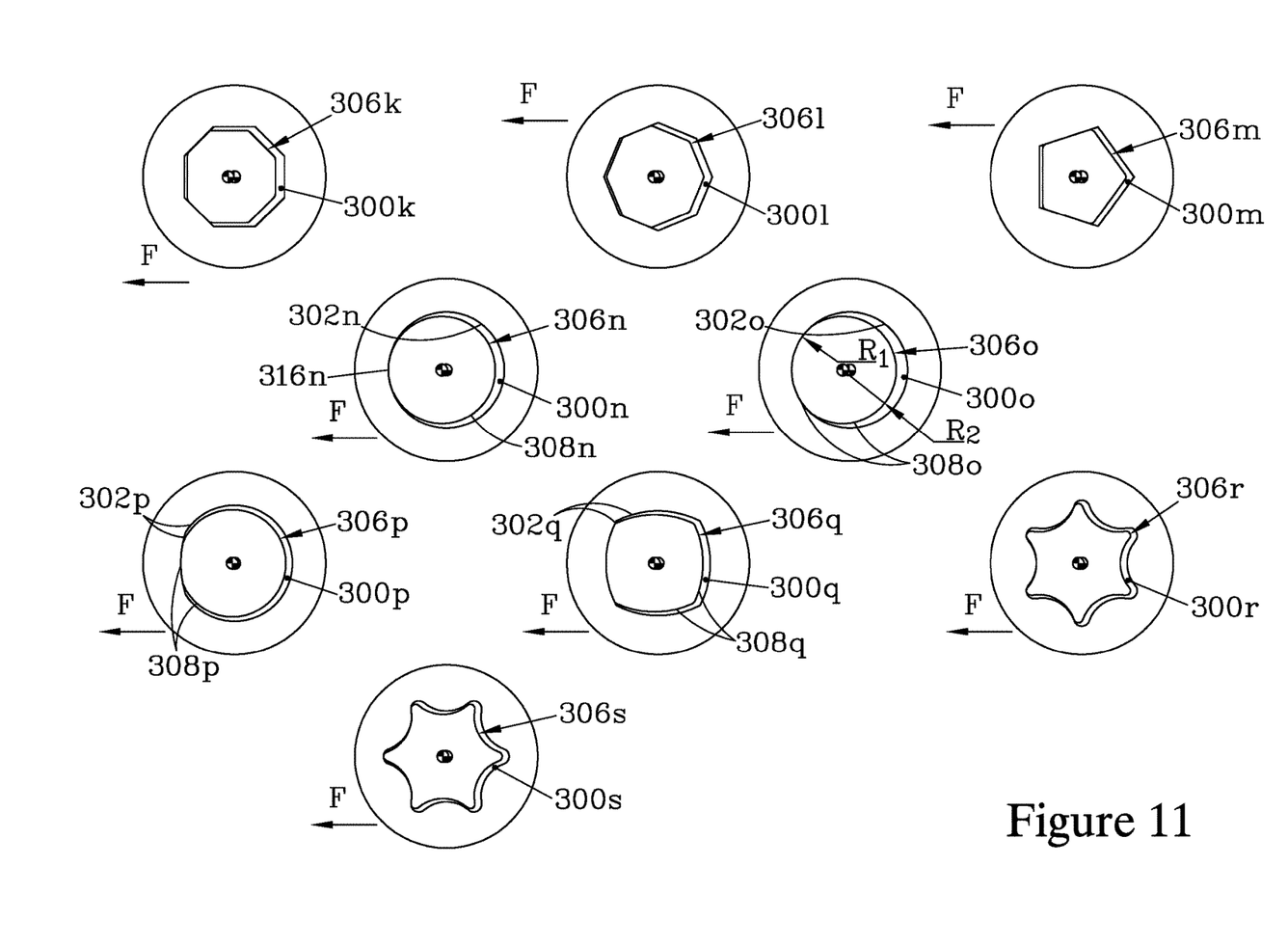

While the embodiments discussed above are illustrated as employing a hexagonal or octagonal protrusion and a corresponding hexagonal or octagonal recess as the mating structures, it should be appreciated that alternative structures could be employed. Some possible alternative mating structures are those taught in U.S. Publication 2015/0351213, incorporated herein by reference. FIGS. 10 and 11 illustrate several examples of shapes that can be employed to provide mating structures for the power transfer assembly of the present invention. In all the illustrated cases, a first mating structure 300 is formed as a shaped recess defined by first mating structure sidewalls 302 that are parallel to a first mating structure axis 304, while a second mating structure 306 is formed as a shaped protrusion defined by second mating structure sidewalls 308 that extend parallel to a second mating structure axis 310. The elements of the power transfer assembly are configured to create an effective offset in the axes (304, 310) in a direction F, requiring the second mating structure 306 to be displaced against spring pressure to insert it into the first mating structure 300, and resulting in a reaction force in the direction F that engages some of the second mating structure sidewalls 308 against corresponding first mating structure sidewalls 302.

The configuration should be selected to provide a balance between sufficient contact to assure electrical conductivity and low resistance to movement of the movable element, so as not to impede the proper action of the electrode of the torch. When the mating structures are faceted, having planar sidewalls, they are typically configured such that contact is along one or two faces; it is felt that trying to form the mating structures so as to provide contact between three or more faces would be impractical to fabricate due to the need for very close tolerances. When configured such that two faces engage, the angle between the faces determines the degree of wedging of the protrusion against the recess, with smaller angles resulting in a greater tendency of wedging, and resulting in higher resistance to motion. Some examples of configurations that could be employed are discussed below.

Mating structures 300a & 306a, 300b & 306b, and 300c & 306c are all hexagonal, but differ in their orientation and/or hexagonal configuration. Mating structures 300a and 306a are regular hexagons, and oriented relative to the offset of the axes (304, 310) such that the force direction F forces a vertex 312a between two of the second mating structure sidewalls 308a against a vertex 314a between two of the first mating structure sidewalls 302a; the result is that two of the second mating structure sidewalls 308a are forced into engagement with a corresponding two of the first mating structure sidewalls 302a. This configuration is similar to that shown in FIG. 2 and discussed above, and has been found to cause moderate wedging and resistance to movement of the movable element relative to the static element when the electrode is blown back to its rear position.

Mating structures 300b and 306b are also regular hexagons, but the orientation of the force direction F in this case is such as to force a single second mating structure sidewall 308b against one of the first mating structure sidewalls 302b. This configuration should provide no wedging and less resistance to motion, but may provide less certain electrical contact between the mating structures (300b, 306b), since only one side is engaged.

Mating structure 300c and 306c are oriented similarly to 300b & 306b, but the proportions of the hexagonal shape of the second mating structure 306c have been altered from a regular hexagon, with the result that two non-adjacent second mating structure sidewalls 308c are forced against two non-adjacent first mating structure sidewalls 302c.

Mating structures 300d-300g and 306d-306g illustrate alternative mating structures that employ regular polygons oriented such that two adjacent sides are biased into contact. The octagonal configuration of mating structures 300d and 306d is similar to the configuration of the mating structures (258, 266) shown in FIGS. 8 and 9, and is felt to provide a particularly desirable balance between providing sufficient electrical contact and offering low wedging and resistance to movement. Pentagonal mating structures 300e and 306e should similarly provide relatively low wedging and resistance, while square mating structures 300f and 306f should result in a moderate amount of wedging and resistance, and the triangular mating structures 300g and 306g providing a significant degree of wedging and resistance.

Mating structures 300h and 306h are essentially similar to the structures 300a and 306a with regard to the contacting surfaces, but are an irregular shape having two contacting sidewalls (302h', 308h') that are essentially similar to the hexagonal sidewalls (302a, 308a), as well as having curved sidewalls (302i''', 308i''') that do not contact. Mating structures 300i and 306i are similar, but provide contact similar to that of the octagonal mating structures 300d and 306d; in this case, the contacting sidewalls (302i', 308i') are essentially the same as the corresponding surfaces of an octagon that is somewhat displaced from the center of semi-cylindrical non-contacting surfaces (302i'', 308i'') to allow the first mating structure 300i to be formed by drilling and subsequently machining to form the contacting second mating structure sidewalls 302i'.

Mating structures 300j and 306j provide a single-sided contact, similar to that of structures 300b and 306b. This configuration is felt to prevent any problems of wedging and thus offer low resistance to movement.

Referring to FIG. 11, mating structures 300k & 306k, 300l & 306l, and 300m & 306m provide contact along two non-adjacent sides, in a manner similar to the mating structures 300c and 306c shown in FIG. 8. The mating structures 300k & 306k are felt to provide moderate wedging and resistance, while the mating structures 300l & 306l and 300m & 306m are felt to result in greater wedging and resistance.

Mating structures 300n and 306n are cylindrical, each having a single cylindrical sidewall (302n, 308n) and providing contact only along a single line 316n; this configuration is felt to result in very limited electrical contact, but also a low resistance to movement. To provide a greater surface of contact, second mating structure 306o has two radii, one radius $R_1$ that matches the radius of first mating structure 300o, and one radius $R_2$ that is smaller. Thus, one second mating structure sidewall 308o matches the radius of the first mating structure sidewall 302o. Similarly, mating structures 300p and 306p are both dual-radius structures, with a common larger radius along their sidewalls (300p, 308p) which are engaged into contact by the spring force F. Mating structures 300q and 306q have a hybrid shape, each having four sidewalls (302q, 308q) defined by a portion of a cylinder where the radii of the cylinders is the same for the mating structures (300q, 306q), but where the first mating structure sidewalls 302q extend further than the second mating structure sidewalls 308q. These mating structures 300o & 306o, 300p & 306p, and 300q & 306q are felt to provide better electrical contact than the cylindrical mating structures 300n and 306n, while still having low resistance to movement.

Mating structures 300r & 306r and 300s & 306s employ a six-lobed structure with a profile similar to that employed in Torx® fasteners and driving tools; such structures can thus be fabricated using existing tooling for forming such fasteners and drivers. The mating structures 300r & 306r theoretically offer five surfaces of contact, but due to machining tolerances are likely to initially only have two lines of contact until worn through use. Because there are initially surfaces in close proximity, this configuration may create problems of arcing between the mating structures 300r & 306r. The mating structures 300s & 306s are likely to be subject to similar limitations.

Figure 12:
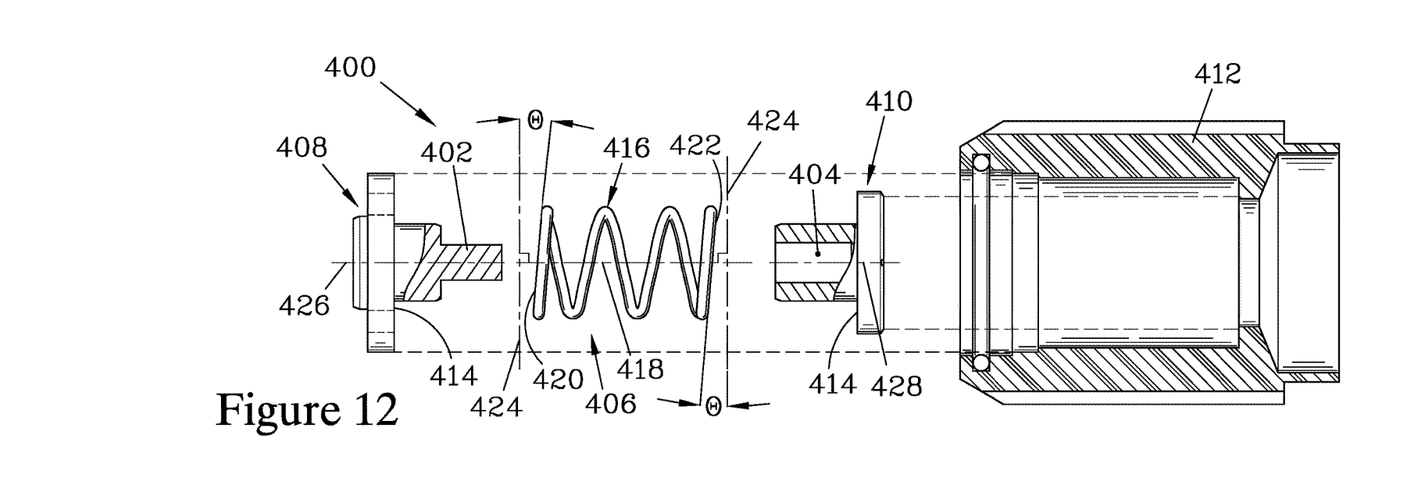
Figure 13:
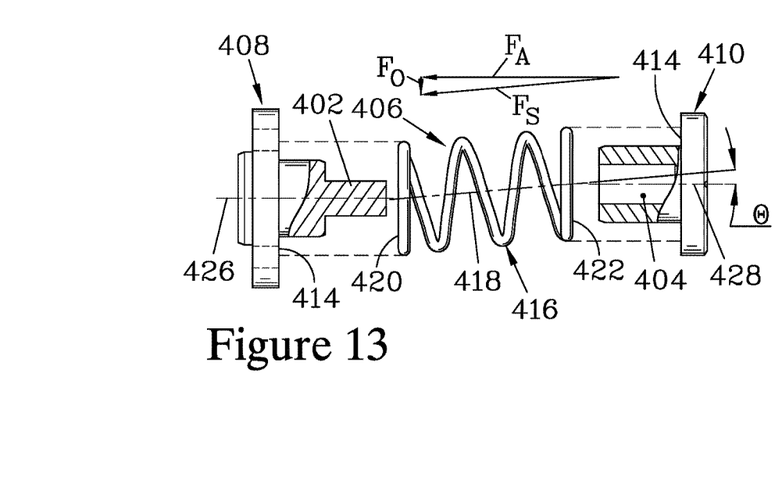
FIG. 13 illustrates the spring and conductive elements of the power transfer assembly shown in FIG. 12 when the spring has been tilted such that its end faces are parallel to bearing surfaces on the conductive elements. The spring natural axis is tilted with respect to the mating structure axes by an angle Φ that matches the inclination of the spring end faces to a plane perpendicular to the spring natural axis.
Figure 14:
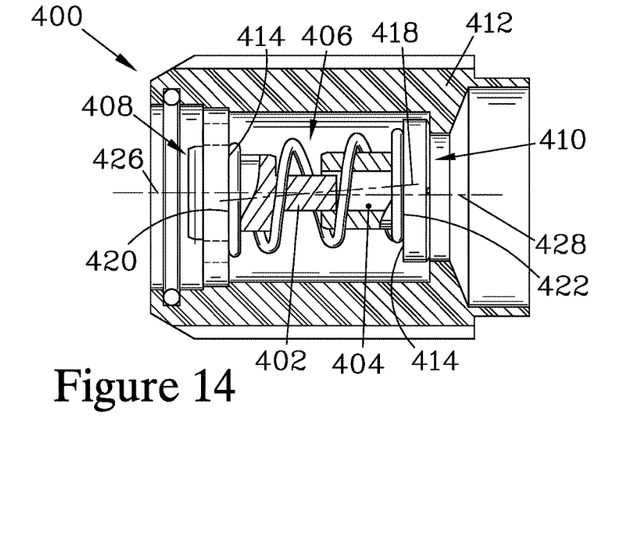
FIG. 14 illustrates the power transfer assembly shown in FIGS. 12 and 13 when assembled and contained in a power transfer housing.

FIGS. 12-14 illustrate a power transfer assembly 400 that employs an alternative scheme for biasing a first mating structure 402 against a second mating structure 404 by use of a spring 406 that also serves to bias an electrode (not shown) to a forward position. The power transfer assembly 400 again has a static element 408 and a movable element 410, and are illustrated as residing in a power transfer housing 412 when the power transfer assembly 400 is assembled as shown in FIG. 14; it should be appreciated that this scheme of biasing the mating structures could be employed for embodiments where the spring is attached to the electrode, in a manner similar to the embodiments shown in FIGS. 5-9. The conductive elements (408, 410) have opposed spring-engaging bearing surfaces 414 for engaging the spring 406 to apply a compressive load thereto, thereby biasing the movable element 410 toward a forward position (toward the right in FIGS. 12-14).

The spring 406 has a coil 416 that, when at rest, is centered on a spring natural axis 418. The spring 406 has a spring first end face 420 and a spring second end face 422, and the spring end faces (420, 422) each reside along planes that are parallel to each other and inclined with respect to planes 424 that are in turn perpendicular to the spring natural axis 418 by an angle Φ, as shown in FIG. 12. The inclination angle Φ should be selected based on the geometry of the mating structures (402, 404), the amount of force desired between the contacting surfaces, and the geometry and reaction force of the spring. For typical applications, it is felt that an inclination angle Φ of about 2°-12° should be effective, with 5° being a good starting point to determine an optimal angle experimentally for a particular application.

The spring-engaging bearing surfaces 414 of the conductive elements (408, 410) extend perpendicular to a first mating structure axis 426 and a second mating structure axis 428. Because the spring end faces (420, 422) are inclined, the spring 406 becomes inclined with respect to these axes (426, 428) when the spring end faces (420, 422) abut against the spring-engaging bearing surfaces 414 (as shown in FIG. 14), this engagement acting to position the spring 406 with its spring natural axis 418 inclined to the mating structure axes (426, 428) by the angle Θ. As shown in FIG. 13, the inclination of the spring 406 creates two components of the spring reaction force $F_S$ that results from the compressive load applied to the spring 406 by the bearing surfaces 414. There is an axial force component $F_A$, which is directed parallel to the mating structure axes (426, 428) and serves to bias the movable element 410 toward its forward position, and there is an off-axis force component $F_O$, which is directed normal to the mating structure axes (426, 428) and thus serves to bias the first mating structure 402 against the second mating structure 404 (as shown in FIG. 14).

Because the biasing action of the spring 406 is independent of any directional features of the conductive elements (408, 410), the configurations of the mating structures should be selected so as not to require a particular direction of the off-axis force component $F_O$ for desired performance. As illustrated, the first mating structure 402 is formed as a cylindrical protrusion, and the second mating structure 404 is formed as a cylindrical recess having a slightly greater diameter. These mating structures (402, 404) are respectively similar to the cylindrical mating structures 306n and 300n shown in FIG. 11, but do not require any misalignment of their axes with respect to the conductive elements (408, 410) on which they are provided. It should be appreciated that the use of a spring that engages the conductive elements so as to become inclined with respect to the mating structure axes could be employed in alternative embodiments, including those where the power transfer assembly is permanently attached to the electrode and replaced therewith; additionally, alternative mating structures could be employed, and where the mating structures are provided by a shaped recess and a shaped protrusion, the shaped recess could be provided on the static element and the shaped protrusion on the movable element.

While the novel features of the present invention have been described in terms of particular embodiments, representative shapes, and preferred applications, it should be appreciated that substitution of materials and modification of details can be made without departing from the spirit of the invention.

What is claimed is:

1. A power transfer assembly for supplying electrical power to an electrode of a contact-start plasma arc torch, the power transfer assembly comprising:
    a conductive static element having a first mating structure defined by first mating structure sidewalls that are parallel to a first mating structure axis, said static element further comprising a static element spring-aligning means that defines a static element alignment axis that is parallel to said first mating structure sidewalls;
    a conductive movable element having a second mating structure that is defined by second mating structure sidewalls that are parallel to a second mating structure axis and which is configured to translatably engage said first mating structure, said movable element further comprising a movable element spring-aligning means that defines a movable element alignment axis that is parallel to said second mating structure sidewalls; and
    a compression spring configured to engage said conductive elements, said conductive elements being configured such that positioning said mating structures to be translatably engaged with each other generates an off-axis force in said spring that acts to bias said mating structures together along at least one line of contact to assure an electrically conductive path through said mating structures, said spring having a coil centered on a spring natural axis when at rest and further wherein said spring engages said conductive elements in such a manner as to apply an off-center force to deflect a portion of said coil away from the spring natural axis when said conductive elements are positioned to slidably engage said mating structures with each other, said spring further comprising:
        a coil first end region that engages said static element spring-aligning means so as to be centered on the static element alignment axis, and
        a coil second end region that engages said movable element spring-aligning means so as to be centered on the movable element alignment axis, wherein the mating structure axes are positioned with respect to the alignment axes of the conductive elements on which said mating structures are provided such that positioning said mating structures to be slidably engaged causes the static element alignment axis to be offset from and parallel to the movable element alignment axis, thereby causing said coil first end region of said spring to be displaced off axis with respect to said coil second end region.

2. The power transfer assembly of claim 1 further comprising:
    a static element contact surface on said static element; and
    a movable element contact surface on said movable element, configured to be axially mateable against said static element contact surface so as to limit translation of said movable element relative to said static element to define a rear position of the electrode,
    said mating structures being configured to provide sufficient translational motion therebetween as to allow said movable element contact surface to be translated into contact with said static element contact surface.

3. The power transfer assembly of claim 2 wherein:
    said static element spring-aligning means is provided by a radially outward facing cylindrical static element spring-aligning surface centered on the static element spring-aligning axis;
    said moveable element spring-aligning means is provided by a radially outward facing cylindrical movable element spring-aligning surface centered on the moveable element spring-aligning axis; and
    said coil end regions are sized to closely encircle said spring-aligning surfaces.

4. The power transfer assembly of claim 2 wherein:
    one of said first mating structure and said second mating structure further comprises at least one recess having a recess depth extending from one of said contact surfaces; and
    the other of said first mating structure and said second mating structure further comprises at least one protrusion having a protrusion length extending from the other of said contact surfaces, the protrusion length being less than the recess depth.

5. The power transfer assembly of claim 1 wherein said spring has a coil centered on a spring natural axis when at rest and the off-axis force between said mating structures is provided by configuring said spring and said conductive elements such that the spring natural axis is inclined with respect to the mating structure axes when said mating structures are translatably engaged with each other, creating a component of spring reaction force that is perpendicular to the mating structure axes.

6. The power transfer assembly of claim 5 wherein:
    said compression spring has a spring first end face and a spring second end face that reside along parallel planes that are inclined with respect to the spring natural axis, and
    said conductive elements each have a spring-engaging bearing surface extending perpendicular to the mating structure axes, whereby the spring natural axis is positioned at an inclination to said mating structure axes when said spring ends abut against said spring-engaging bearing surfaces.

7. The power transfer assembly of claim 6 further comprising:
    a static element contact surface on said static element; and
    a movable element contact surface on said movable element, configured to be axially mateable against said static element contact surface so as to limit translation of said movable element relative to said static element to define a minimum separation between said spring-engaging bearing surfaces, said mating structures being configured to provide sufficient translational motion therebetween as to allow said movable element contact surface to be translated into contact with said static element contact surface.

8. The power transfer assembly of claim 7 wherein:
    one of said first mating structure and said second mating structure further comprises at least one recess having a recess depth extending from one of said contact surfaces; and
    the other of said first mating structure and said second mating structure further comprises at least one protrusion having a protrusion length extending from the other of said contact surfaces, the protrusion length being less than the recess depth.

9. The power transfer assembly of claim 7 wherein said spring end faces are each inclined with respect to a plane perpendicular to the spring natural axis by an angle Φ measuring between 2° and 12°.

10. A power transfer assembly for supplying electrical power to an electrode of a contact-start plasma arc torch, the power transfer assembly comprising:
- a conductive static element having a first mating structure defined by first mating structure sidewalls that are parallel to a first mating structure axis, wherein said static element is configured to engage a power supply element of the torch when the assembly is installed into a torch;
- a conductive movable element having a second mating structure that is defined by second mating structure sidewalls that are parallel to a second mating structure axis and which is configured to translatably engage said first mating structure, wherein said movable element is provided by an integral portion of the electrode of the torch;
- a compression spring configured to engage said conductive elements, said conductive elements being configured such that positioning said mating structures to be translatably engaged with each other generates an off-axis force in said spring that acts to bias said mating structures together along at least one line of contact to assure an electrically conductive path through said mating structures, said spring having a coil centered on a spring natural axis when at rest and further wherein said spring engages said conductive elements in such a manner as to apply an off-center force to deflect a portion of said coil away from the spring natural axis when said conductive elements are positioned to slidably engage said mating structures with each other; and
- a power transfer housing in which said static element is affixed so as to engage a power supply element of the torch when said power transfer housing is installed into the torch, said power transfer housing having a ledge that limits forward motion of said movable element relative to said static element, said ledge being configured to allow the electrode of the torch to engage said movable element.

11. A power transfer assembly for supplying electrical power to an electrode of a contact-start plasma arc torch, the power transfer assembly comprising:
- a conductive static element having:
  - a static element spring-aligning means that defines a static element alignment axis, and
  - a first mating structure defined by first mating structure sidewalls that are parallel to the static element alignment axis;
- a conductive movable element having:
  - a movable element spring-aligning means that defines a movable element alignment axis, and
  - a second mating structure defined by second mating structure sidewalls that are parallel to the movable element alignment axis, said second mating structure being configured to translatably engage said first mating structure in a direction parallel to the alignment axes; and
- a compression spring having a coil, said coil having,
  - a coil first end region that engages said static element spring-aligning means so as to be centered on the static element alignment axis, and
  - a coil second end region that engages said movable element spring-aligning means so as to be centered on the movable element alignment axis; wherein said first mating structure sidewalls are positioned relative to the static element alignment axis and said second mating structure sidewalls are positioned relative to the movable element alignment axis such that positioning said mating structures to be translatably engaged causes the static element alignment axis to be offset from and parallel to the movable element alignment axis, and thus said coil first end region of said spring is displaced off axis with respect to said coil second end region.

12. The power transfer assembly of claim 11 further comprising:
- a static element contact surface on said static element; and
- a movable element contact surface on said movable element, configured to be axially mateable against said static element contact surface so as to limit translation of said movable element relative to said static element to define a rear position of the electrode, said mating structures being configured to provide sufficient translational motion therebetween as to allow said movable element contact surface to be translated into contact with said static element contact surface.

13. The power transfer assembly of claim 12 wherein:
one of said first mating structure and said second mating structure further comprises at least one recess having a recess depth extending from one of said contact surfaces; and
the other of said first mating structure and said second mating structure further comprises at least one protrusion having a protrusion length extending from the other of said contact surfaces, the protrusion length being less than the recess depth.

14. The power transfer assembly of claim 13 further comprising a power transfer housing in which said static element is affixed so as to engage a power supply element of the torch when said power transfer housing is installed into the torch, said power transfer housing having a ledge that limits forward motion of said movable element relative to said static element, said ledge being configured to allow the electrode of the torch to engage said movable element.

15. The power transfer assembly of claim 13 wherein:
said static element is configured to engage a power supply element of the torch when the assembly is installed into a torch, and
said movable element is provided by an integral portion of the electrode of the torch.

* * * * *